United States Patent [19]

Keene

[11] 4,311,385
[45] Jan. 19, 1982

[54] COHERENT DETECTION LAG ANGLE COMPENSATED SCANNING SYSTEM INDEPENDENT OF INHOMOGENEITIES OF THE DETECTOR

[75] Inventor: Wayne H. Keene, Medfield, Mass.

[73] Assignee: Raytheon Company, Lexington, Mass.

[21] Appl. No.: 200,854

[22] Filed: Oct. 27, 1980

Related U.S. Application Data

[63] Continuation of Ser. No. 54,101, Jul. 2, 1979, abandoned.

[51] Int. Cl.³ .................. G01B 11/26; G01C 3/08
[52] U.S. Cl. .................................. 356/152; 356/5; 356/28.5
[58] Field of Search .............. 356/5, 141, 152, 28, 356/28.5

[56] References Cited

U.S. PATENT DOCUMENTS

| | | | |
|---|---|---|---|
| 3,413,633 | 11/1968 | Lehmann | 343/10 |
| 3,565,528 | 2/1971 | Witte | 356/5 |
| 3,790,278 | 2/1974 | Buczek et al. | 356/5 |
| 3,984,685 | 10/1976 | Fletcher | 356/28.5 |

*Primary Examiner*—S. C. Buczinski
*Attorney, Agent, or Firm*—Vincenzo D. Pitruzzella; Joseph D. Pannone; Milton D. Bartlett

[57] ABSTRACT

A coherent detection scanning laser system having an optical system that compensates for the angular deviation of the received signal resulting from the scanning process, and having a detection system with output independent of spatially varying sensitivity or response of the detector caused by inhomogeneities therein.

In one embodiment, the local oscillator reference signal is compensated for the lag angle and the detector is placed at the image plane of the scanning antenna, and system geometry is arranged so that the image plane of the mirror providing the compensating reference signal coincides with the image plane of the scanning antenna. In another embodiment, the received signal is compensated for lag angle and the system geometry is arranged so that the detector receives a focused signal permitting the use of a smaller area.

14 Claims, 2 Drawing Figures

COHERENT DETECTION LAG ANGLE COMPENSATED SCANNING SYSTEM INDEPENDENT OF INHOMOGENEITIES OF THE DETECTOR

Cross-Reference to Related Cases

This is a continuation of application Ser. No. 54,101, filed July 2, 1979, now abandoned.

BACKGROUND OF THE INVENTION

Coherent detection scanning systems used for ranging, doppler velocity or imaging applications are known in the prior art. A problem that arises in high performance coherent detection scanning systems is that of lag angle. The signal reflected by a target arrives at the optical antenna a finite amount of time after being transmitted from the optical antenna, the time delay being equal to 2 R/c, where R is the range of the target and c is the speed of light. Thus, the position of the scanning optical antenna system has moved appreciably during this time. The angular change of the scanning antenna is the lag angle. It causes the received signal to be misaligned with respect to the portion of the transmitting signal used as the local oscillator reference signal.

The output signal of the detector is found to be adversely affected by this misalignment, resulting in an increasing signal loss as the misalignment increases. This effectively limits the scanning rate and results in a degraded performance of the system.

Another problem encountered in high performance coherent detection scanning systems occurs when the spatially combined local oscillator and received signals are projected on different regions of a detector as the position of the scanning antenna changes. This results in fluctuations in the detector output signal due to the non-uniformity of the detector surface.

SUMMARY OF THE INVENTION

A scanning system is a system used to radiate a region with a succession of electromagnetic waves in a systematic pattern.

A coherent detection system is a system that uses a local oscillator signal to derive information from the received signal.

Lag angle is defined as the angle through which the scanning antenna moves during the transit time of the laser wave to the target and back. This transit time causes the received signal to reflect on the scanning antenna at a different angle than that of the transmitting signal resulting in an improper mixing of the received signal with the local oscillator signal.

It is an object of this invention to provide a high performance scanning coherent detection system having a compensation for lag angle.

It is another object to eliminate the deleterious effects effects of spatial interference patterns between the local oscillator and received signals on the detector.

It is a further object to provide for a uniform detector output signal in the presence of a non-uniform detector.

It is an even further object to provide for the use of a smaller detector area to improve sensitivity due to a reduction in thermal noise and background noise of the detector.

In this invention, a scanning coherent detection system provides scanning antenna means for transmitting and receiving coherent electromagnetic waves. It employs means for optically aligning a portion of the transmitting wave and the received wave with respect to each other. It also employs means for projecting the aligned portion of the transmitting wave and the received wave on a detector.

This invention further provides means for generating a coherent electromagnetic wave and scanning means for transmitting the generated wave and for receiving a signal wave reflected by a target. It also provides means for deriving a local oscillator reference wave from the generated wave, and lag angle compensating means for optically aligning the local oscillator reference wave and the received wave in a singular beam. It also employs means for projecting this singular beam on a detector.

Further, in accordance with this invention, a laser is used to provide the coherent electromagnetic wave. This wave is then split into two components by a beamsplitter: one to serve as the local oscillator reference signal, the other to be transmitted and then received by the optical scanning antenna. A stationary afocal telescope is used to expand the transmitting laser beam and reduce the beam returned by the target. The scanning antenna can be simply a rotating mirror. The optical orientation of the local oscillator reference signal is compensated by another mirror assembly to correct for the lag angle error of the received signal. The compensated reference signal and the received signal are then directed onto a lens by a combination of two beamsplitters which serve to align these two signals in the same optical path. The lens then projects the two signals on a detector.

This invention further provides for placing the detector not at the focal plane of the lens, but at the image plane of the correcting optical assembly which, by appropriate positioning of all the elements, coincides with the image plane of the correcting optical assembly which, by appropriate positioning of all the elements, coincides with the image plane of the scanning mirror. Thus, for all positions of the optical scanner the reference signal and the received signal are projected on the same region of the detector making it immune to inhomogeneities therein, thereby allowing the use of less uniform, and therefore less expensive, detectors.

In another embodiment, a laser is used to provide the coherent electromagnetic wave. This wave is again split into two components by a beamsplitter: the local oscillator and transmitting signals. The optical orientation of the received signal is compensated by a beamsplitter to correct for the lag angle error. The local oscillator signal and the compensated received signal are then directed onto a lens by a beamsplitter so that they can be focused on a detector placed in the focal plane of the lens. This embodiment results in a smaller beam size being projected on the same area of the detector. This allows the use of a smaller detector area, thereby reducing thermal and background noise and improving the sensitivity of the system.

BRIEF DESCRIPTION OF THE DRAWING

A better understanding of the features of the preferred embodiment may be obtained from the accompanying detailed description used in conjunction with the drawings in which like reference numbers refer to like parts or items and in which.

Figure 1:
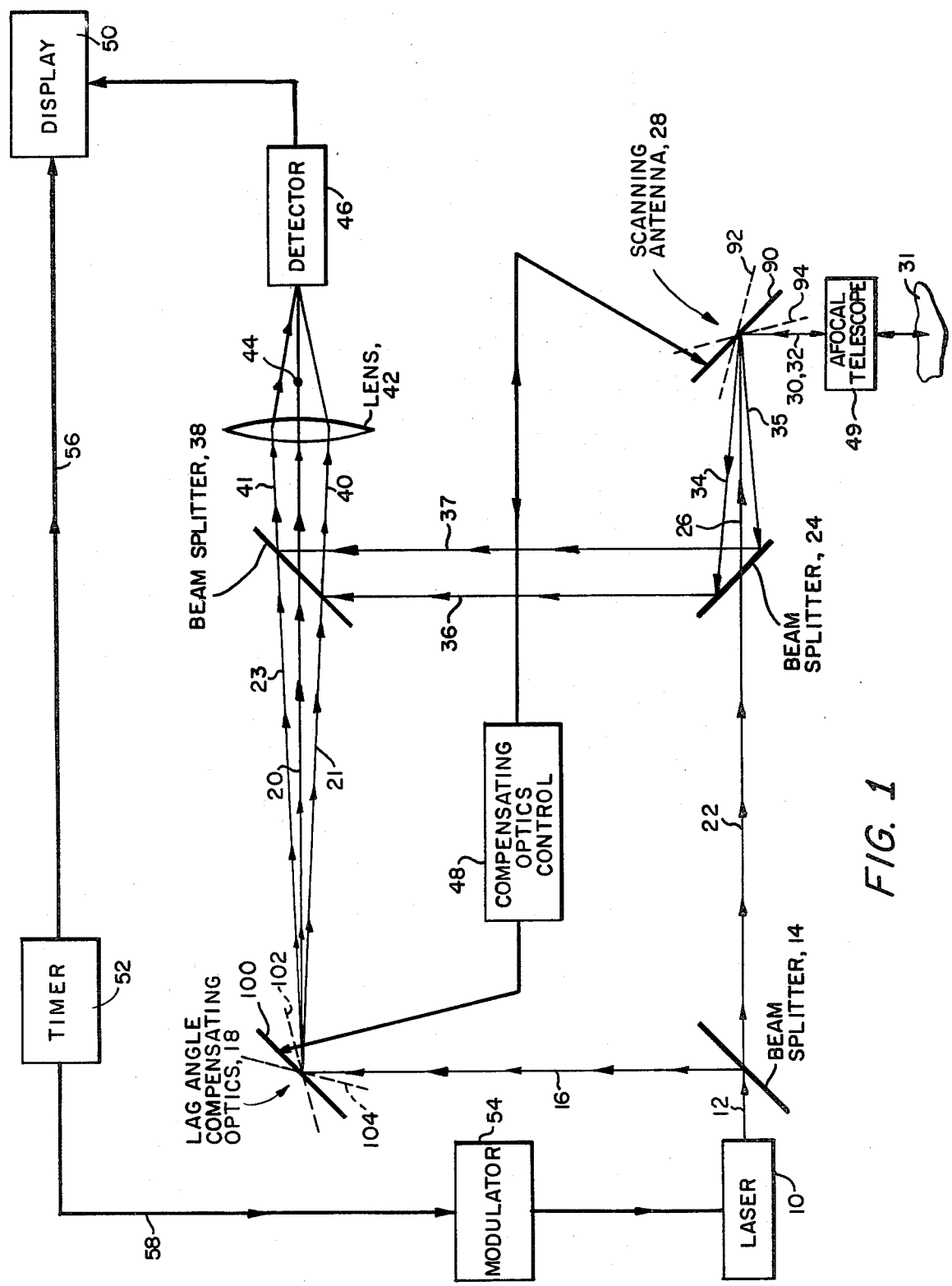
FIG. 1 is a block diagram illustration of one embodiment.
Figure 2:
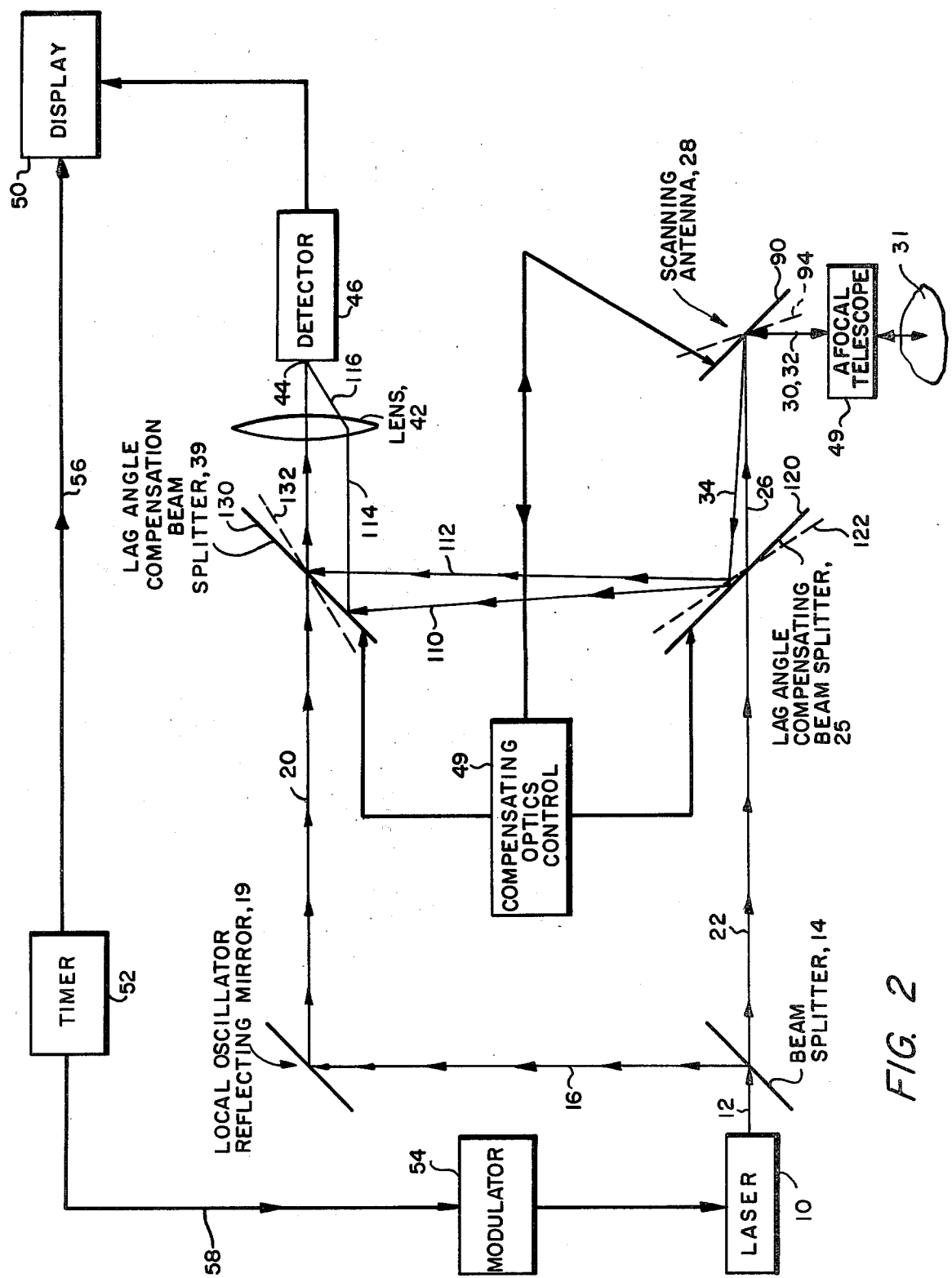
FIG. 2 is a block diagram illustration of a second embodiment.

In both FIG. 1 and FIG. 2, the angles of reflection and transmission and overall system geometry are not drawn to scale, instead they have been exaggerated for purposes of illustration.

DESCRIPTION OF THE PREFERRED EMBODIMENT

Referring now to FIG. 1, a laser 10 generates coherent electromagnetic waves or beam 12. Beam 12 passes through the beamsplitter 14, where a portion 16 of the transmitting beam to be used as the local oscillator reference signal is directed onto the lag angle compensating optics 18, which can be a mirror. From mirror 18 this local oscillator reference beam is transmitted through a beamsplitter 38, from where it is directed onto lens 42.

The remainder of transmitting beam 22 passes unaffected through beamsplitter 24 and then onto scanning antenna 28 through optical path 26. From a first position 90 of the scanning antenna 28 the transmitting beam 30 is transmitted through an afocal telescope 49 to expand the laser beam. The afocal telescope is provided so as to obtain the required transmitting beam size in relation to the size of the beam available at the laser. The relationship between the two is expressed as D=d f2/f1, where D is the transmitting beam size, d is the laser beam size, f2 and f1 are the focal length of the output and input lens respectively and f1 is shorter than f2. Another constraint is due to the reduction of scan angular range of the output in relation to the input. The amount of reduction is given by A=f1/f2 a, where a is the input beam entry angle, f1 and f2 are the focal lengths of the input and output lens respectively, and A is the output beam exit angle. Thus, for a given angular scanning range of interest the telescope has to accommodate a much larger angular change at the input lens. As the transmitted signal 30 is reflected by a target 31, it becomes signal 32 which is then reduced by telescope 49 and then received by the scanning antenna 28. Signal 32 is incident on scanning antenna 28 at the same angle that signal 30 was reflected from scanning antenna 28 but offset by a lag angle. This occurs since a finite amount of time elapses from the time that beam 30 is transmitted to the time that it is received and the scanning antenna continues to rotate in a clockwise rotation to a second position 94. Thus, received signal 32 is reflected by the scanning antenna 28 along optical path 34 onto beamsplitter 24. Optical path 34 is not parallel to optical path 26, since the scanning antenna 28 has rotated by the lag angle from its first position 90. Beamsplitter 24 directs the received signal along the optical path 36. Beamsplitter 38 directs received signal 36 onto lens 42 using optical path 40. If the lag angle compensating optics were to remain stationary, the reference signal would be directed along optical path 20. However, path 20 of the reference signal and path 36 of the received signals would not be incident on beamsplitter 38 so as to be oriented parallel to each other between beamsplitter 38 and lens 42, even though these signals are in the same plane.

The wave fronts of these two signals are not parallel, therefore, for any given lag angle, at any instant of time a spatial interference pattern is generated at the surface of the detector. This instantaneous interference pattern is a function of the angle described by the directions of travel of the wave fronts of the local oscillator and received signals, and is in turn proportional to the lag angle. As the misalignment angle increases, the degree of coherence between the two signals decreases. The degree of coherence is represented by a correlation function of the two signals and the output signal of the detector is related to this correlation function. It then follows that the output signal of the detector decreases rapidly as the misalignment angle increases. Thus, as return signals are received from different ranges or different angles the response of the detector changes, creating a non-uniform detector output signal as a function of range.

The effects caused by the misalignment of the two waves are important in a high performance system of the type described by this invention. Consider a laser used to generate a phase coherent signal that is then reflected by a dispersive target. The return signal will have many different components of different phases due to the discontinuities of the dispersive target. If the target is stationary with respect to the scanning system, all the components of the return signal maintain the same original frequency since they are all reflected by the same stationary target. Each component can be expressed as a sinusoidal wave having the same frequency and a unique phase shift. The $n^{th}$ component then can be expressed as $A_n \text{SIN}(wt+\phi_n)$, where $A_n$ is the amplitude, w is the frequency of the transmitted signal and $\phi_n$ is the phase shift from the transmitted signal of the $n^{th}$ component. The composite signal is then given by the summation of all the individual components and is given by $C \sin(wt+\Phi)$, where C is the amplitude of the composite signal, w is the transmitted frequency, and $\Phi$ is the composite phase shift with respect to the transmitted signal. The composite received signal also maintains spatial coherence with the transmitted signal. Consider a beam of wavelength $\lambda$ transmitted through an aperture of diameter d and reflected by a target at range R. At the target, the diameter of the beam is larger than at the source because of divergence. The diameter D of the beam at the target is given by $R\lambda/d$. As the beam is reflected toward the receiving aperture, the coherence diameter of the receiving aperture is given by $R\lambda/D$. Substituting the expression for D from above, it is found that the receiver diameter needed for maintaining coherence is equivalent to the diameter of the transmitting aperture. Thus, by using the same aperture for both transmitting and receiving the beam coherence is preserved. The composite received signal and local oscillator signal will then give rise to an interference pattern according to well known optical theory.

As the target moves in relation to the scanning detection system, the received signal experiences a Doppler frequency shift due to their relative speed. In the range of applications of this invention, the Doppler shift is larger than the laser transmitter bandwidth, therefore, the sinusoidal local oscillator and composite Doppler shifted received signal will generate an interference pattern on the detector.

By using a compensating optics control 48 to rotate the lag angle compensating optics 18 in a coordinated manner with respect to scanning antenna 28, the reference beam is directed along optical path 21, and will now be incident on beamsplitter 38 at an angle such that the reference signal and the received signal can be optically aligned to be parallel to each other along optical path 40 so that no deleterious spatial interference takes effect at the surface of the detector.

After proper alignment is achieved, the reference signal and the received signal are projected by lens 42 on a detector 46. Detector 46 is placed not at the focal plane 44, but on the image plane on lens 42 of the lag angle compensating mirror 18 and of the scanning antenna 28. The physical arrangement of the lag angle compensating mirror 18, the set of two beamsplitters 24 and 38, and scanning mirror 28 is adjusted so as to produce a coincidence between the image plane of lag angle compensating mirror 18 and the image plane of the scanning antenna 28. This is done by making the two object distances the same with respect to lens 42, where the object distance of scanning mirror 28 to lens 42 equals the object distance of the lag angle compensating mirror 18 to lens 42. The local oscillator reference beam incident on lens 42 from compensating mirror 18 can be considered as a beam originating at an aperture positioned at the location of compensating mirror 18. Similarly, the received beam incident on lens 42 can be considered as originating from an aperture positioned at the location of scanning mirror 28. Since compensating mirror 18 and scanning mirror 28 are at the same distance from lens 42 and the two beams are incident on lens 42 in alignment, the two beams can be considered as originating from a common aperture, at a distance from the lens equal to the distance from lens 42 of compensating mirror 18. This arrangement results in the beams being projected on the same area of the detector 46 for all the usable scanning positions of antenna 28.

The output signal from detector 46 and a synchronizing signal 56 from timer 52 are applied to a display unit 50. A similar signal 58 from timer 52 is used to control a modulator 54 to control laser 10 such that the output of laser 10 and the display 50 are synchronized for every revolution of scanning mirror 18. Display 50, timer 52 and modulator 54 are of the type suitable for similar scanning applications and are known in the art. They are not described in detail since they are not a part of this invention, and are available to those skilled in the art.

To understand the function that the compensating optics control 48 has to perform, consider first the situation where there is a target at the same range for all scanning positions and the scanning antenna 28 rotates clockwise at a uniform angular speed. In this case the lag angle is constant, since the transit time from the antenna 28 to the target and back is the same for all positions of the antenna 28 within the angular range of interest. In this situation, the lag angle compensating optics 18 is stepped from its uncompensated position 100 to position 102 and is held there throughout the scanning process. The actual position, and, therefore, the angle described by optical path 20 and 21, is proportional to the range of the target.

To operate the system where the targets are not at a constant range, the compensating mirror 18 is first positioned so as to compensate for the initial range selected while the scanning mirror 28 is made to scan through its usable angular range. Ths position of the lag angle compensating mirror 18 is then changed for every scan of the scanning mirror 28 to correct for an increasingly larger lag angle so as to detect signals coming from an increased range.

The final position of compensating mirror 18 corresponds to the last range of interest. Thus, stepping the lag angle compensating mirror 18 for every scan of the scanning mirror 28 between the two extreme lag angles of interest is equivalent to detecting targets within the two ranges of interest for increasingly successive ranges. The step size is determined by the desired resolution.

The output signal of detector 46 can then be used as the intensity input of display 50. A signal representing the position of the lag angle compensating mirror 18 can be used as the range input of display 50, while a signal representing the position of the scanning mirror 28 can be used as the azimuth input of display 50 in order to obtain a plot of the received signal as a function of range and azimuth.

Other embodiments can be used without departing from the spirit of this invention. For instance, consider again a constant target range arrangement but with the scanning antenna restricted in its angular range between positions 92 and 94 and oscillating back and forth between these positions at a constant speed. As antenna 28 moves clockwise from position 92 to position 94, the lag angle is constant and compensating optics control 48 positions lag angle compensating optics 18 from uncompensated position 100 to compensated poposition 102 for the duration of the clockwise scan. As antenna 28 reaches position 94, it reverses its scan direction keeping the same angular speed. Now the lag angle is the same as before for all positions but its direction changes. For this counterclockwise scan the received signal 32 is reflected along optical path 35 from where it is reflected by beamsplitter 24 along optical path 37. The compensating optics control 48 must now step compensating optics 18 to position 104 and hold it there for the duration of the counterclockwise scan. Thus, local oscillator signal 16 is reflected along optical path 23, so that it can be aligned by beamsplitter 38 with the received signal along optical path 41.

Again, to use this system for targets at unknown ranges the lag angle compensating optics 18 must be made to compensate for all ranges of interest. The motion of compensating optics 18 is more complex as it must be stepped between the two extreme ranges of interest and also be adjusted in its position to correct for the change in direction of the lag angle for the counterclockwise scan.

Similarly, another embodiment could be used where the scanning mirror 28 is attached to a torsional pendulum imparting a sinusoidal scan. Since the scan angular speed is sinusoidal, compensating optics control 48 can no longer simply step compensating optics 18 between position 102 and 104. Instead it must impart to compensating optics 18 a corresponding sinusoidal oscillation between positions 102 and 104.

In general then, compensating optics control 48 must compensate for the characteristics of the scanning rate and for different target ranges. This compensation can be accomplished using standard feedback control techniques that aren't described here since they are known in the art.

As an alternative to the scheme of compensating the local oscillator reference signal for lag angle, FIG. 2 shows an embodiment where the received beam 32 is directly compensated for lag angle. As before, laser 10 generates beam 12 from where a local oscillator reference signal 16 is directed onto a stationary local oscillator mirror 19. From mirror 19 the reference signal 20 is transmitted through beamsplitter 39, and is then directed onto lens 42 along its optical axis. The received signal 32 is reflected by scanning antenna 28 along path 34 since scanning antenna 28 has moved to position 94. Without any compensation lag angle compensating beamsplitter 25, in position 120, would transmit the received signal along optical path 110. Splitter 39 then would direct it along optical path 114. Lens 42 would focus on the detector the local oscillator signal along path 20 and the received signal along path 116. However, the two signals would not be aligned with each other resulting in deleterious intereference. Thus, lag angle compensating beamsplitter 25 is rotated clockwise and positioned by compensating optics control 49 to position 122. Compensating beamsplitter 25 now transmits the received signal along optical path 112. Lag angle compensating beamsplitter 39 is likewise rotated clockwise from uncompensated position 130 and positioned so as to transmit beam 112 along the same optical path as local oscillator beam 20 from the compensated position 132. Thus, both local oscillator and received beams are aligned on the same optical path and are transmitted onto lens 42 along its optical axis for all positions of scanning antenna 28. Lens 42 focuses the two aligned beams on detector 46 which is positioned at the focal plane 44 of lens 42. Since the beams are focused on the same spot for all angles of scanning antenna 28, a smaller detector area can be used. This reduces the thermal and background noise, resulting in an improved signal-to-noise ratio and, therefore, in an improved system sensitivity.

The high performance coherent detection system just described can be used to detect targets at a wide variety of ranges. In a system having such a large range there is a small amount of ambiguity for targets in very close proximity to each other, since the resolution of the system is finite. To see how this system resolves targets at closely related ranges and azimuth angles, consider the system in FIG. 1 where the lag angle compensating optics 18 is set to compensate for a given range and scanning mirror 28 is frozen in time in a position to detect targets from a given azimuth angle, such as target 31. Target 31 then reflects the transmitted signal such that it is perfectly aligned with the local oscillator signal at the detector. In this case, the two signals maintain maximum coherence and generate the maximum signal for this target. If there are other targets having close proximity in range or azimuth to the optimum compensated target 31, they result in received signals having a small spread of lag angle errors. These signals are incident on the same area of the detector as the local oscillator signal, but are not perfectly aligned with it. They then give rise to interference. The degree of partial coherence, also explainable in terms of correlation function, is proportional to the angle between the wavefronts of the received and local oscillator signals. The greater the misalignment between these signals, the smaller their contribution to the output of the detector will be, due to a reduced correlation between the signals.

This results in a target resolution curve that is sharply bell shaped. The signal intensity as a result of a target that is not optimally compensated is significant only for very minor deviations in range and azimuth angle. As the range or azimuth angle deviation increases, the signal output at the detector due to such target decreases rapidly. Thus, the target resolution capability of the system is subject to a small ambiguity for targets within a very narrow spread in range or azimuth, but the ambiguity decreases rapidly as the targets spread increases.

Even though the embodiments described employ a single scanning antenna as both transmitter and receiver, the principles of the invention can be used in a scanning system using separate antennas for the transmitter and receiver. Other modifications will also be apparent to those skilled in the art without departing from the spirit and scope of the invention. Accordingly, it is intended that this invention be not limited to the specific embodiments disclosed herein except as defined by the appended claims.

I claim:

1. A coherent detection scanning system comprising in combination:
   scanning antenna means for transmitting and receiving coherent electromagnetic waves;
   optical means for aligning the wavefronts of a portion of said transmitted waves and a portion of said received waves with respect to each other;
   control means for sequentially driving said optical means to one of a plurality of positions in coordination with the motion of said scanning antenna, each of said positions resulting in alignment of said wavefronts for said portion of waves received from a predetermined range; and
   means for projecting said aligned waves on a detector.

2. The combination of claim 1 wherein:
   said projecting means are positioned to project said aligned waves on the same region of said detector for all positions of said scanning means and for any range in a predetermined set.

3. A coherent detection scanning system comprising in combination:
   means for generating a coherent electromagnetic wave;
   means for deriving a local oscillator reference wave from a portion of said generated wave;
   scanning means for transmitting said generated wave and for receiving signal waves reflected by a target;
   lag angle compensating means for optically aligning in a singular beam said reference wave and a portion of said reflected waves;
   control means for sequentially positioning said compensating means in coordination with the motion of said scanning means for producing alignment of said reference wave and said portion of reflected waves for a plurality of predetermined ranges; and
   means for projecting said singular beam on a detector.

4. The combination of claim 3 wherein:
   said projecting means project said singular beam on the same area of said detector for all positions of said scanning means.

5. The combination of claim 3 or 4 wherein:
   said compensating means correct said received wave for lag angle.

6. The combination of claim 3 or 4 wherein:
   said compensating means correct said local oscillator reference wave for lag angle.

7. The combination of claim 3 wherein said lag angle compensating means further comprise:
   means for correcting said reference wave for lag angle; and
   means for optically directing said received signal wave and said corrected reference wave in a parallel direction, said optical directing means being positioned at a distance from said correcting means equal to the distance from said optically directing means to said scanning means.

8. The combination of claim 7 wherein:

said detector is positioned at the image plane of said correcting means resulting from said projecting means.

9. In combination:
lasing means for generating a coherent electromagnetic beam;
scanning means for deriving a reference beam from said generated beam;
means for transmitting said generated beam and for receiving a return beam from a target;
means for producing lag angle compensation comprising optical means for introducing a lag angle offset in said reference beam, and control means for sequentially driving said optical means through a predetermined range of lag angle offset positions in coordination with the motion of said scanning means;
means for optically combining said return beam with said reference beam; and
a detector positioned to receive said combined beams.

10. The combination of claim 9 further comprising:
focussing means; and wherein
said combining means are positioned so as to produce a coincidence of the image plane of said scanning means with the image plane of said lag angle offsetting means; and
said detector is placed at said coinciding image planes.

11. The combination of claims 9 or 10 further comprising:
means for expanding said transmitted beam and for reducing said received beam.

12. The combination of claims 9 or 10 further comprising:
an afocal telescope positioned in front of said scanning means.

13. In combination:
lasing means for generating a coherent electromagnetic wave;
means for deriving a reference signal from said generating wave;
scanning means for transmitting said generated wave and for receiving a return signal from a target;
means for producing lag angle correction comprising optical means for correcting said return signal for lag angle, and control means for sequentially driving said optical means through a predetermined range of lag angle correcting positions in coordination with said scanning means;
means for optically combining said reference signal and said lag angle corrected return signal; and
a detector positioned to receive said combined signals.

14. The combination of claim 13 further comprising:
focussing means positioned in front of said detector to focus said combined signals; and wherein
said detector is placed at the focal plane of said focussing means.

* * * * *

UNITED STATES PATENT OFFICE
CERTIFICATE OF CORRECTION

Patent No. 4,311,385      Dated January 19, 1982

Inventor(s) Wayne H. Keene

It is certified that error appears in the above-identified patent and that said Letters Patent are hereby corrected as shown below:

Column 5, Line 58:    Change "Ths" to --The--.

Column 9, Line 7:    Delete "scanning".

Column 9, Line 10:    Before "means" insert --scanning--.

Signed and Sealed this

Twenty-third Day of March 1982

[SEAL]

Attest:

Attesting Officer

GERALD J. MOSSINGHOFF

Commissioner of Patents and Trademarks